United States Patent
Maller et al.

(10) Patent No.: US 6,873,514 B2
(45) Date of Patent: Mar. 29, 2005

(54) INTEGRATED SOLENOID SYSTEM (75) Inventors: Dennis A. Maller, Racine, WI (US); Todd McMahon, Greenfield, WI (US)

(73) Assignee: Trombetta, LLC, Menomonee Falls, WI (US)

( * ) Notice: Subject to any disclaimer, the term of this patent is extended or adjusted under 35 U.S.C. 154(b) by 137 days.

(21) Appl. No.: 10/163,627

(22) Filed: Jun. 5, 2002

(65) Prior Publication Data
US 2004/0240140 A1 Dec. 2, 2004

Related U.S. Application Data (60) Provisional application No. 60/295,974, filed on Jun. 5, 2001.

(51) Int. Cl.[7] .................................................. H01H 9/00
(52) U.S. Cl. ........................... 361/160; 361/161; 361/2; 361/78; 361/88; 361/93; 361/115; 361/194; 361/165; 361/203; 318/471; 318/472; 318/473; 236/67; 236/69; 236/88; 236/104
(58) Field of Search ................................ 361/160, 161, 361/2, 78, 88, 93, 115, 194, 165, 203; 318/471, 472, 473; 236/67, 69, 88, 104

(56) References Cited

U.S. PATENT DOCUMENTS

| | | | | |
|---|---|---|---|---|
| 3,857,068 A | * | 12/1974 | Braunstein | 361/37 |
| 4,209,820 A | * | 6/1980 | Rundel et al. | 361/622 |
| 4,860,158 A | * | 8/1989 | Brown | 361/165 |
| 5,119,260 A | * | 6/1992 | Huhse et al. | 361/2 |
| 5,303,560 A | * | 4/1994 | Hanson et al. | 62/126 |
| 5,815,364 A | * | 9/1998 | Hurley et al. | 361/160 |
| 6,401,976 B1 | * | 6/2002 | Estelle et al. | 222/52 |

* cited by examiner

Primary Examiner—Anthony Dinkins
Assistant Examiner—Anton Harris
(74) Attorney, Agent, or Firm—Ryan Kromholz & Manion, S.C.

(57) ABSTRACT

An integrated solenoid system including a single housing containing a solenoid, a controller and one or more electrical connections. The controller includes temperature compensating means and/or voltage compensating means thereby providing predetermined, substantially constant currents to said solenoid. The housing includes an integral two-part end cover.

36 Claims, 4 Drawing Sheets

INTEGRATED SOLENOID SYSTEM

RELATED APPLICATION

This application claims the benefit of Provisional Patent Application Ser. No. 60/295,974, filed 5 Jun. 2001, now abandoned.

FIELD OF THE INVENTION

This invention relates generally to an integrated system solenoid, and in particular to a single housing containing a solenoid, controller and one or more electrical connections.

BACKGROUND OF THE INVENTION

A solenoid is a common electrical device used to convert electrical energy into mechanical energy. Solenoids are well known in the art and are often utilized as a means of moving a component a predetermined distance at a predetermined time. In its most basic form, a solenoid is an electro-mechanical device that converts electrical energy into linear or rotary motion. Electrical current passes through a coil of insulated copper wire producing a magnetic field, which moves a ferro-magnetic plunger located within the core of the coil. Steel parts surround the coil to contain the flux path for maximum pull, push or rotational force. A solenoid can be used to open a valve, activate a switch, apply a brake or a number of other activities where mechanical movement is required and only an electrical energy source is available or practical.

A typical solenoid comprises a steel frame or shell that surrounds the coil of wire and directs the flux path. The coil assembly, when energized with an electrical voltage, creates the magnetic lines of force. A plunger, located within the coil assembly, reacts to the magnetic pull and moves to center itself within or along the coil toward and against a stop or pole piece. The pole piece provides a stop for plunger movement.

A solenoid system requires, at a minimum a solenoid and an electric control. In many applications, the electric control comprises an electronic control module. Most prior art solenoid systems require each individual solenoid and individual control module be connected to one another with a predetermined length of electrically conductive wire. While these prior art systems continue to be viable for many applications, the present invention advances the art by consolidating the multiple components into a single housing or enclosure.

While a controller located within a solenoid housing has been utilized in the past to control the movement of a solenoid, an integrated solenoid system having the structure and benefits, as set forth below, is believed to be novel. The inventor is aware of a product manufactured by the assignee of the present invention for Leslie Controls, Inc. of Tampa, Fla. known as a "Solicon" that incorporates a controller within the solenoid housing. However, the controller for the Solicon device is relatively complex, costly and requires considerable space. The inventor is also aware of a solenoid built by an unknown company in Poland that also places the controller within the housing. Again, temperature compensation is not provided in the control circuit and voltage compensation occurs only in a low power or "hold" mode of operation. Another major drawback of these designs resides in their overly large size and expensive circuitry. The inventor is not aware of any other prior art that teaches the unique combination of components and resulting benefits disclosed herein.

SUMMARY OF THE INVENTION

The present invention provides solenoid operational control by encasing the electronic control in the solenoid housing. By minimizing the control size, the invention provides more operational capacity without increasing the overall size of the solenoid housing. By reducing the number of separate components, the invention improves the cost effectiveness of a typical solenoid application. All of these improvements allow designers the maximum amount of flexibility in development.

It is common knowledge in the art of solenoid design that the force produced by the solenoid has a direct relationship to the current flowing through the coil of the solenoid. The current flow through the coil of a direct current (DC) solenoid is directly related to resistance of the coil and the voltage applied across the coil. If the coil is wound from copper wire as is typical, the resistance of the coil will vary in response to changes in temperature of the copper wire. The resistance of copper changes by about 0.4% per degree Centigrade change in temperature. Such changes in temperature may be caused by external factors, i.e. the ambient temperature of the environment the solenoid exists in, heat radiated or conducted to or from the solenoid, etc. Coil temperature will also increase as a result of wattage dissipated by the coil due to current flow through the coil wire because of electrical resistance in the wire. The power dissipated (P) is a function of current (I) squared multiplied by the resistance (R) of the coil, $P=I^2R$.

As a result, without any compensating means, the performance of a solenoid is affected by variations in applied voltage and by variations in coil temperature. Solenoids are commonly applied in mobile equipment applications. These can be particularly demanding because operating voltage levels can vary greatly. Requiring operation over voltage ranges of 16 volts maximum, down to 10 or even 6 volts minimum are realistic situations. Compounding the problem, operating temperatures of the coils can vary from −40 degrees Centigrade to over 100 degrees Centigrade. Under such varying conditions, a given coil may operate at currents that vary as much as 400% from minimum to maximum over the full range of extreme voltage and temperature combinations. The solenoid must be designed to generate adequate force under the minimum current conditions. Accordingly, it will have far more force than required and consume far more power than required when conditions are at maximum or even nominal values. Furthermore, any device performing electrical control of the solenoid must handle the excessive currents that will be generated under conditions of high voltage and low temperature. These factors all tend to lead to the selection of increased component size and increased costs.

It is also known to those skilled in the art of design and application of solenoids that one means to overcome these unwanted variations is to apply electrical power to the solenoid by some device that regulates current. Current regulating controllers typically involve more complexity and resultant circuitry size and cost than controllers that do not regulate current. A typical means to monitor or sense current involves a current sense resistor placed in series with the coil so it experiences the same current as the coil. These are often bulky, may be costly and generate additional heat in the controller circuit. Providing means to remove the added heat may be problematic.

It is an object of this invention to substantially compensate, by means of a novel electronic controller, for changes in supply voltage and changes in solenoid temperature so as to gain most or all of the benefits of conventional current regulated solenoid controllers while avoiding many of the factors that typically adversely affect size and cost of such controllers. This is achieved in part by placing the controller in the same housing as the solenoid such that a temperature sensitive resistor (thermistor) conveniently and conventionally mounted to the circuit board experiences temperatures that are substantially the same as the solenoid coil.

It is an object of the present invention to provide a solenoid assembly wherein the solenoid and controller are contained in one housing.

It is an object of the present invention to provide a single device containing a solenoid and controller thereby eliminating the need for two separate enclosures, electrical connections between the separate enclosures, additional installation space, and additional installation costs.

It is another object of the present invention to provide an integral electrical connector formed in the assembly housing.

It is another object of the present invention to provide a solenoid system having no lead wires in the system. Lead attachment involves costly labor and the lead attachment can prove to be one of the more mechanically fragile elements of the solenoid construction.

It is yet another object of the present invention to provide an efficient, yet robust circuit to approximately compensate for voltage and temperature fluctuation.

It is yet another object of the present invention to provide an integral solenoid system housing having a two-piece cover that provides tolerance for potting irregularities and deformities that commonly occur and have aesthetic impact.

It is yet another object of the present invention to provide a means of connection with a watertight electrical connector.

In one embodiment the invention may be described as an integrated solenoid system comprising a solenoid, a control circuit having an output connected to said solenoid, a housing, the solenoid and control circuit each located within the housing, said control circuit including a temperature compensating means for monitoring system temperature and adjusting the control circuit output in consideration of system temperature, and said temperature compensating means being connected to said control circuit.

In another embodiment the invention may be described as an integrated solenoid system comprising a solenoid, a control circuit having an output connected to said solenoid, a housing, the solenoid and control circuit each located within the housing, and the control circuit including a voltage compensating means for monitoring supply voltage available at the solenoid system and adjusting the control circuit output.

In a third embodiment the invention may be described as an integrated solenoid system comprising a solenoid, a control circuit connected to said solenoid a housing, the solenoid and control circuit each located within the housing, said control circuit having control means to control a voltage output to the solenoid at a plurality of predetermined levels and having timing means to control the sequence and timing of said voltage output, said control circuit including a voltage compensating means for monitoring a supply voltage available at the solenoid system and adjusting the voltage output, and said control circuit including a temperature compensating means for monitoring a system temperature and adjusting the voltage output.

Another aspect of the invention includes a solenoid assembly comprising a housing, a solenoid, said solenoid being located within said housing, a primary cover, said primary cover being adapted to be received on one end of said housing, a secondary cover, said secondary cover being adapted to be received within an opening formed in said primary cover, and said primary cover being located on said housing end and said secondary cover being placed within said opening.

BRIEF DESCRIPTION OF THE DRAWINGS

Further objects and advantages of this invention will become apparent from the following description taken in conjunction with the accompanied drawings in which.

DETAILED DESCRIPTION

The present invention is depicted in FIGS. 1 through 7. Like parts illustrated and described herein are designated by like reference numerals.

Figure 1:
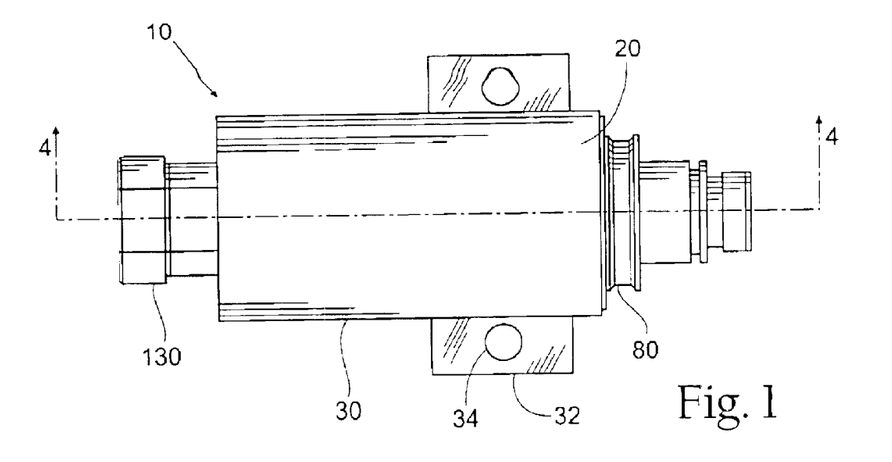
FIG. 1 is a top plan view of the integrated system solenoid.
Figure 2:
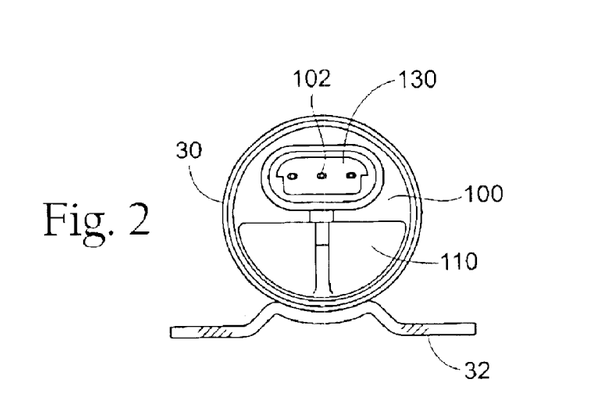
FIG. 2 is a rear elevation view.
Figure 3:
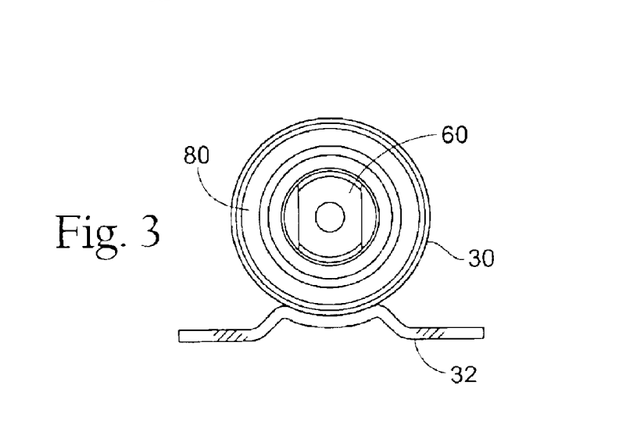
FIG. 3 is a front elevation view.
Figure 6:
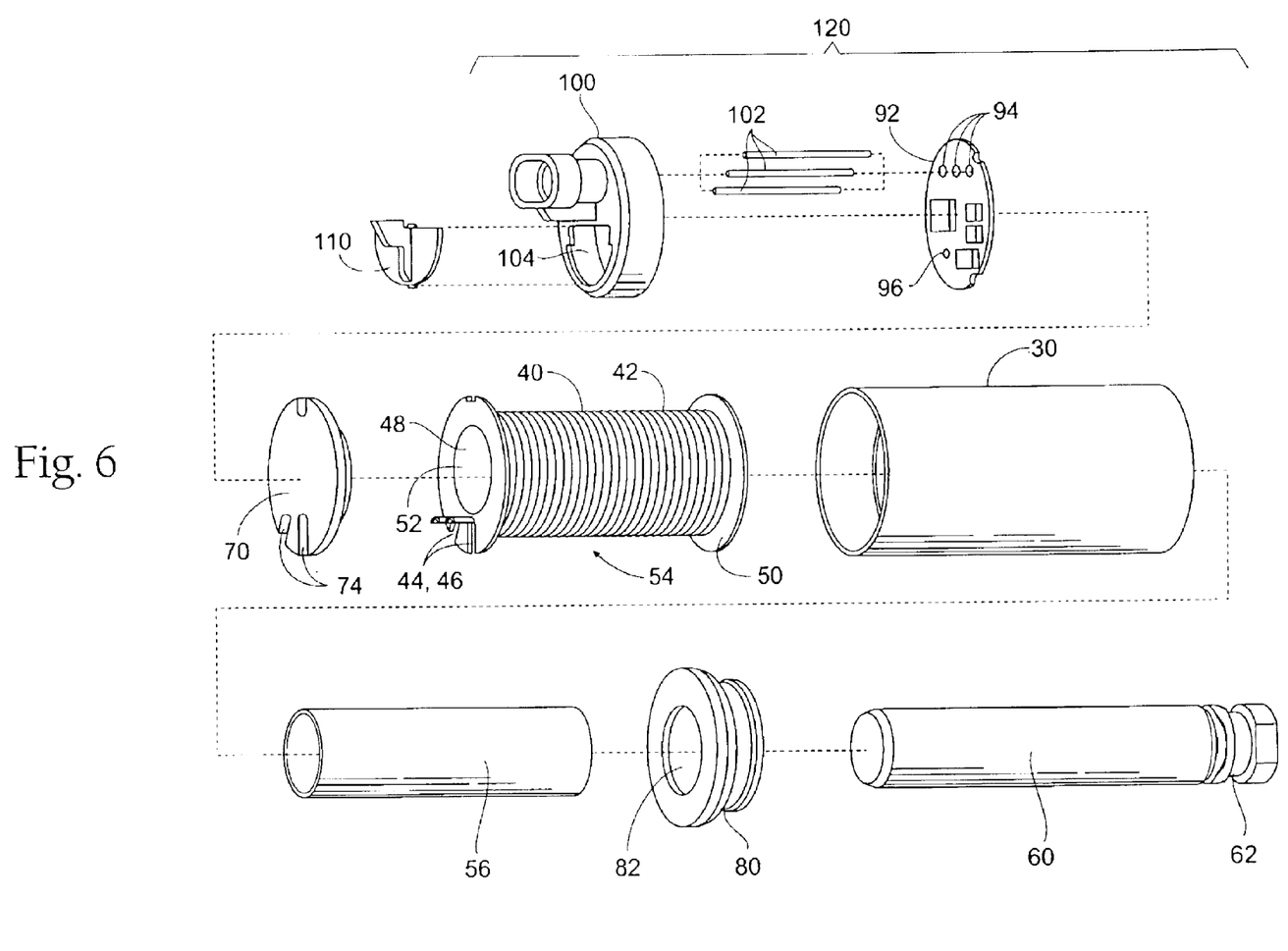
FIG. 6 is an exploded perspective view.

Referring to the drawings, and partiuculary to FIGS. 1 and 6 there is illustrated a solenoid 20. The solenoid 20 is enclosed within a housing 30. The housing may be formed from steel tubing or any other suitable material. In one embodiment and for purposes of example only, the housing is approximately 3.08 inches in length and has a diameter of 1.625 inches. A saddle type side mounting bracket 32 with two (2) holes 34 on 2.00 inch centers is attached to the housing 30 for mounting or mechanical interface.

Within the housing 30 is placed the bobbin 40 that is wound with magnetic wire 42. The bobbin 40 is preferably fabricated from a nylon material and includes two passageways 44, 46 on one end. The first passageway 44 is formed where the tube portion 48 of the bobbin meets the side 50 and allows one end of the winding wire 42 to pass there through. The other passageway 46 is formed near the outer periphery of the bobbin side 50 and allows the second end of the winding wire 42 to also pass there through. In the illustrated embodiment, the coil contains 146 turns of 15.5 STAI size wire thereby forming the solenoid coil assembly 54. The total resistance of the illustrated embodiment coil assembly is preferably between 0.142 and 0.160 ohms.

A brass tube 56 is positioned within the core 52 of the bobbin 40. In the illustrated embodiment, the brass tube is 2.555 inches in length and 0.813 inches in diameter. The tube 56 has a 22 -gauge wall thickness.

The solenoid plunger 60 has a clearance fit within the inner diameter of the brass tube 56 as shown. The plunger is preferably formed from cold rolled steel. In the illustrated embodiment, the plunger 60 is 3.465 inches in length and 0.750 inches in diameter. The exposed end of the plunger may have one or more undercut grooves 62 formed therein and may have an opening 64 or threaded opening 66 formed therein also.

Figure 4:
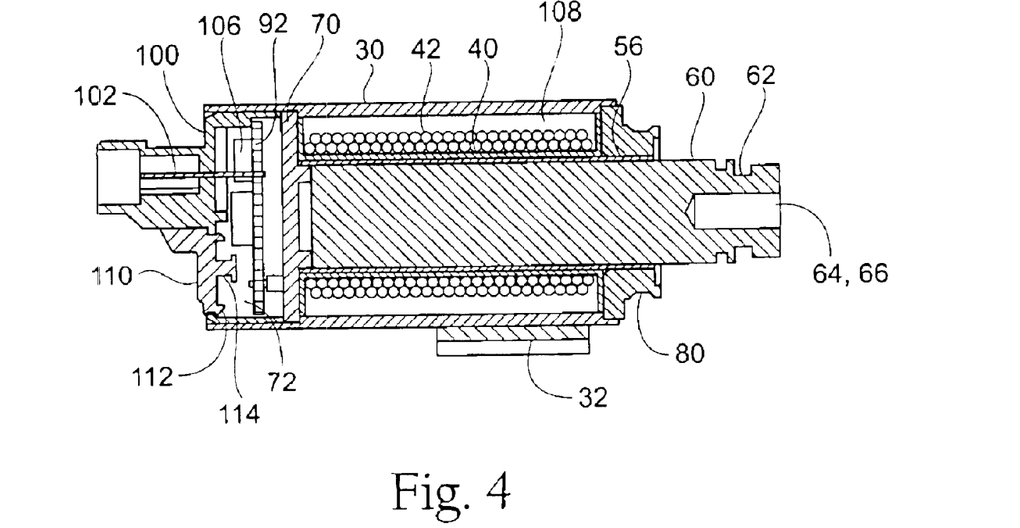
FIG. 4 is a cross sectional view taken along line 4—4 of FIG. 1.
Figure 5:
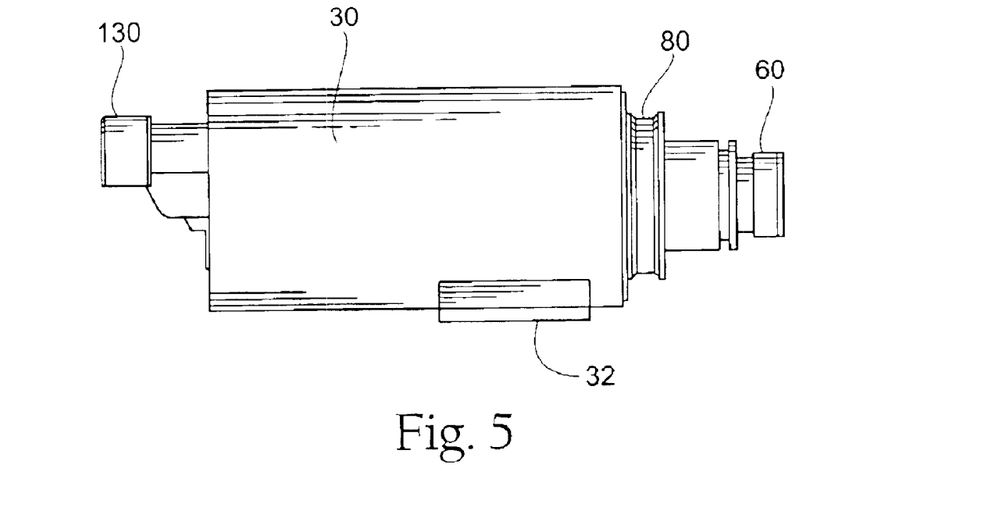
FIG. 5 is a side elevation view.

Abutting one end of the bobbin 40 is the pole piece 70. The pole piece 70 is fabricated from cold rolled steel. The pole piece 70 provides a stop for the plunger 60 when it is in its fully retracted position. The pole piece 70 is assembled into the end of the housing assembly 30. As shown in FIG. 4, the pole piece 70 is set into the housing a predetermined distance to create a cavity 72 for the control circuit 90 discussed below.

A nose piece 80 is assembled into the opposite end of the housing 30. The nose piece 80 is also formed from cold rolled steel and includes a central opening 82 through which the plunger 60 protrudes. Again, a clearance fit is provided.

Within the cavity formed adjacent the pole piece 70 there is located the control circuit 90. The control circuit 90 receives power and a control signal through three inputs J1-1, J1-2 and J1-3 and is connected to the coil assembly through two outputs J2-1 and J2-2.

Figure 7:
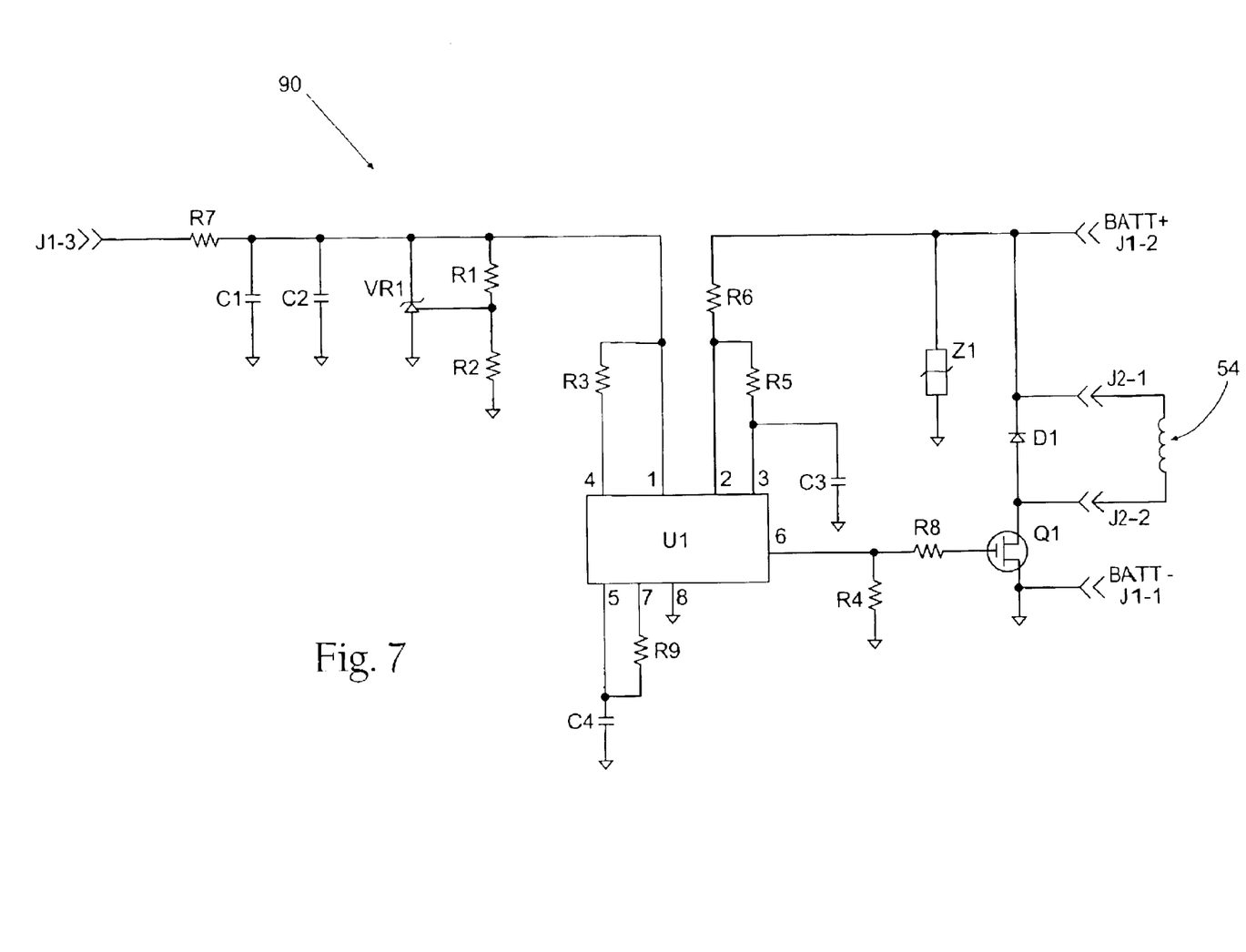
FIG. 7 is a schematic diagram of the control circuit.

The control circuit 90 shown in FIG. 7 is a Pulse Width Modulation (PWM) type controller used to drive the solenoid coil 54. The controller 90 functions as a voltage over-energizer control. The basic benefit afforded by such a control is that solenoid 20 can be momentarily energized at a power (wattage) level well above its continuous duty capacity. The continuous duty capacity is a function of the solenoid's thermal constant (approximately B degree Centigrade temperature rise per watt of electrical energy being dissipated), the temperature rating of the components used to construct the solenoid 20, and the ambient temperature of the environment where the solenoid operates.

When the solenoid 20 is operated at power levels that are a multiple of it's continuous duty capacity (i.e. over-energized), it is capable of doing significantly more work than when it is operated at a power level equal to its continuous duty capacity (normally energized). This is due to the fact that the magnetically derived force produced by solenoid 20 is directly related to the electrical energy being applied to the coil 54. A more detailed description of operation and benefits of this type of controller can be found in U.S. Pat. No. 6,256,185 entitled Low Voltage Direct Control Universal Pulse Width Modulation (PWM) Module issued on 3, Jul. 2001, assigned to same assignee as the present invention and incorporated herein by reference.

Referring again specifically to FIG. 7, resistors R7, R1, and R2 along with capacitors C1 and C2 and voltage regulator VR1 compose a nominal 5-volt power supply. The power supply derives energy to operate from plus input J1-3 and minus input J1-1. J1-3, the plus control serves as a power input source for signal level power and also in effect serves as the on/off command signal input for the controller. VR1 is a shunt type voltage regulator, P/N TL1431ID as manufactured by ST Microelectronics of Geneva, Switzerland and others. This device acts as a dynamic current load that draws current to ground in greater or lesser amounts as required in attempting to maintain a constant voltage across its anode and cathode terminals. The regulated voltage is programmed via its reference terminal using the resistive divider comprised of resistors R1 and R2. R7 limits the current that VR1 must control in order to regulate voltage down to 5 volts from the level applied at input J1-3. The J1-3 input voltage will typically be in the range of 10 to 16 volts. The value of R7 must be chosen low enough to allow adequate current to the controller circuit 90 under the lowest system voltage conditions for which the controller is specified to operate, 6 volts in the illustrated embodiment. Capacitors C1 and C2 store energy local to the circuit 90 so as to maintain a relatively stable 5-volt supply in the event of momentary disturbances in the voltage applied at J1-3. The combination of R7, C1, and C2 furthermore compose a low pass filter circuit that smoothes any rapidly occurring disturbances in voltage that might occur at J1-3. Such voltage disturbances can be induced by other electrical apparatus connected to, or in close proximity to the electrical system in which the controller 90 operates.

Q1 is a power MOSFET that functions as a very fast acting on/off switch connected between the coil 54 of the solenoid 20 and the power source (not shown), which in the case of mobile equipment, is usually a battery. The percent of time that Q1 is on out of a given period of time is referred to as the output duty cycle (duty cycle):

$$Duty\ cycle\ (\%)k=[(Q1\ on\ time)/(Q1\ on\ time+Q1\ off\ time)]\times100\%$$

The circuit operates as follows: Q1 is off (duty cycle =0%) when J1-3 has no voltage applied. When voltage is applied to J1-3 the controller takes a small amount of time (approximately 40 mS) to initialize itself. Once initialization is complete, Q1 is turned on and off with a relatively high duty cycle that causes the solenoid to be over-energized. After approximately 0.25 seconds, the on/off duty cycle of Q1 is reduced substantially such that the solenoid is being normally energized and therefore may be maintained energized for an indefinite period of time. Longer or shorter over-energized time periods may be used, as the specific application requires. The on/off switching of Q1 is performed at a frequency of approximately 1K Hz. Higher or lower switching frequencies may be used. Higher frequencies tend to increase switching related losses and create more electrical magnetic interference (EMI). Lower frequencies result in greater fluctuation in coil current and hence greater fluctuation in magnetic force of the solenoid throughout the PWM cycle.

Typically the solenoid 20 moves the load attached to its plunger 60 while the coil 54 is over-energized. Once the work of moving the load is completed, the solenoid plunger 60 is in a position wherein the magnetic efficiency is relatively high and therefore only a small amount of electrical energy input is required to hold the load in position.

D1 is a freewheeling diode of the Schottky variety. It is used to slow the decay of current flow and the associated magnetic field in the solenoid coil 54 during the periods when Q1 is off. D1 slows this decay to the point that the current and related force decay during the off portion of the PWM cycle is small enough to not significantly affect actuation and holding of the load.

Z1 is a transient voltage suppression device of the Metal Oxide Varistor (MOV) variety. It serves to absorb abnormal high amplitude transient voltage spikes that sometimes occur in electrical systems. In so doing, it protects other components of the controller from being damaged.

U1 is an 8-bit One Time Programmable (OTP), CMOS RISC micro-controller with self-contained oscillator. In the illustrated embodiment, it is a PIC12C508A variety as manufactured by Microchip Corp. It is capable of operating with no ancillary support components accept as required to create its required nominal 5-volt power supply (actual specified operating voltage range is 3.0 to 5.5). U1 generates the PWM drive signal that controls Q1 on and off via Q1's gate terminal. Applying nominal 5 volts between Q1's gate and source terminals causes Q1 to turn on. Because Q1's source terminal is tied to ground, applying approximately 5 volts to Q1's gate turns Q1 on. Conversely, reducing the voltage at Q1's gate to near 0 volts, or ground potential, causes Q1 to turn off.

The code programmed into U1 sets the PWM frequency and establishes the basic timing and over-energized and normally energized duty cycles. The PWM duty cycle in both over-energized and normally energized states are adjusted to compensate for variations in the main system supply voltage at J1-2 and operating temperature of the solenoid. In so doing, the performance of the solenoid 20 is made far more stable and the stresses imposed on the solenoid 20 and the controller 90 are substantially reduced compared to what they are in an uncompensated system.

The combination of R6, R5, and C3 under the control of U1 terminals (pins) 2 and 3 comprise a simple and low cost dual slope analog to digital (A/D) converter that monitors the main system voltage as it presents itself at J1-2. Voltage determination is made by alternately allowing C3 to charge from the unknown system voltage at J1-2 via the series combination of R6 and R5 over a fixed period of time, and then discharging C3 to the logic 0 threshold of U1 pin 3, via R5 and U1 pin 2. U1 pin 2 is allowed to float (set in tri-state mode) to facilitate charging C3. After the fixed integration time has elapsed, U1 pin 2 is switched on (to ground) to facilitate discharge of C3. While discharging, U1 monitors the digital value on pin 3, the voltage across C3, and keeps track of the amount of time that it takes to reach the logic 0 threshold. When the voltage falls to the lower threshold (logic 0) of U1 pin 3, U1 pin 2 is switched back to a tri-state mode, allowing R6 and R5 to charge C3 for the next integration period. The cycle thus repeats on a continuing basis. Therefore, the discharge time will be proportional to the applied battery voltage at J1-2. In the illustrated embodiment, the resistors are 1% initial tolerance with 100 ppM temperature coefficients. C3 is a relatively low cost ceramic capacitor of the temperature stable (X7R dielectric) type. This type of capacitor is acceptable because variations in C3 will only affect the peak voltage across C3 during the integration time period. Its value is not a factor in the actual analog to digital conversion process.

The combination of R9 and C4 under the control of U1 pins 5 and 7 comprises a very cost efficient temperature monitoring circuit. R9 is a voltage dependant resistor (thermistor) that is soldered to the printed circuit board on the surface that is closest to the solenoid coil 54 when the controller printed circuit board 92 is installed in the assembly 10. The temperature of R9 is very representative of the temperature of the solenoid coil 54 due to proximity. Changes in coil temperature caused by ambient variation and/or by self (electrical) heating of the coil are tracked. Temperature determination is made in the following manner: C4 is charged from voltage output at U1 pin 7 through R9 until the upper (logic 1) voltage threshold of U1 pin 5 is reached. C4 is then discharged through R9 and U1 pin 7 until the lower voltage (logic 0) threshold of U1 pin 5 is reached. This charge/discharge cycle repeats itself with the circuit operating as a free running oscillator for which the operating frequency is a function of the values of R9, C4, the voltage output at U1 pin 7, and the voltage thresholds of U1-5. The voltage output at U1 pin 7 is relatively stable due to the fact that U1's outputs are very efficient (low loss) at low current loads and due to the relatively tight regulation of U1's 5-volt power supply as managed by VR1. The logic thresholds of U1 pin 5 are relatively stable because that pin of the 12C508A is a Schmidt trigger input, having more stringently defined voltage thresholds than the other input/output pins, and also due to good power supply voltage regulation. C4 is a high quality film capacitor with 5% initial tolerance and low temperature drift. All these factors lead to changes in the frequency of oscillation being predominately dependant upon changes in the resistance of R9. R9's resistance is temperature dependant in a strictly defined manner. That allows the micro-controller to derive an approximate temperature by measuring the frequency of oscillation.

R4 is provided to guarantee that the U1 pin 6 and more significantly, the Gate of Q1 is held low during the power-up initialization of U1. R5 is provided to allow tempering the turn on and turn off speed of Q1 if desired to reduce switching induced electrical noise or electro magnetic interference (EMI).

R3 is a pull up resistor used to tie U1 pin 4 to the 5-volt supply. This helps to maintain U1 pin 4, an unused input, at a stable logic 1.

The integrated solenoid system 10 is assembled as follows. Nose piece 80 is assembled to the housing 30 and crimped in place. The brass tube 56 is next inserted into the housing 30. The coil assembly 54 is placed into the housing 30 with the brass tube 56 located inside the bobbin core 52. The pole piece 70 is inserted into the opposite end of the housing 30 with the coil wires 42 extending through the notches 74 formed in the pole piece 70. The pole piece 70 sits flush with the back side of the coil assembly 54.

The cover 100 and circuit 90 are assembled. This includes pressing the three terminal pins 102 into the molded cover 100. The circuit board assembly 92 is placed into the cover 100 with the pins 102 extending through corresponding holes 94 in the circuit board 92. The circuit board 92 is soldered to the terminal pins 102 at each location forming cover and circuit assembly 120.

The cover and circuit assembly 120 is next inserted into the housing 30 while guiding the coil magnet wires 42 through corresponding holes 96 in the circuit board assembly 92. The housing assembly 30 is crimped at the cover end and the magnet wire ends are soldered to the circuit board 92. The excess wire that extends above the surface of the circuit board is trimmed. After positioning the solenoid assembly 20 with the cover opening 104 facing upward, the coil and circuit board cavity 72 and coil cavity 108 are filled with potting material 106. The secondary cover 110 is placed into the cover opening 104 while the potting material 106 is still in the liquid state. The secondary cover 110 is secured to the main cover 100 with snap tabs 112 and will also be anchored with anchor structure 114 in the potting material 106 once cured. Finally, the solenoid plunger 60 is inserted into the brass tube 56.

Care has been taken in the physical layout of the control circuit 90 to place components that carry large amounts of current and potentially generate the most heat, are positioned for efficient routing of the copper foil pattern and for best thermal performance.

In the illustrated embodiment 10, the operating voltage is in the range of 6.0-15.0 volts (V) continuous, 16V intermittent (30 minute), and 24V jump start for 5 minutes maximum. The pull current (Pulse) is less than 50 amperes average during pull-in. The hold current (sustained) may be less than 1.0 ampere. Maximum cycle rate of the solenoid system is designed to be approximately 10 cycles in one (1) minute, non-repetitive burst, and approximately four (4) cycles per minute sustained. The preferred electrical connection 130 is a 3-pin Delphi Packard Electric Metri-Pack Series 150 male style connector that is integral to solenoid cover 100.

The electrical connections include first and second primary power input terminals. A third electrical terminal provides a 12-volt nominal, 20-milliamp nominal control signal. This feature allows the primary power wiring to be routed by most direct means to battery source. Light gage control wiring may be run to point of command.

The following is a list of exemplary components that may be used in the circuit illustrated in FIG. 7. These components are merely exemplary and other components could be utilized or readily substituted without departing from the scope of the present invention.

| Exemplary Components | |
|---|---|
| Resistors | |
| R1 | 10 KOhms, 0.1 watt |
| R2 | 10 KOhms, 0.1 watt |
| R3 | 10 KOhms, 0.1 watt |
| R4 | 10 KOhms, 0.1 watt |
| R5 | 15 KOhms, 0.1 watt |
| R6 | 1.0 MOhms, 0.1 watt |
| R7 | 390 Ohms, 1.0 watt |
| R8 | 200 Ohms, 0.1 watt |
| Thermistors | |
| R9 | 150 kOhms at 25 C. |
| Capacitors | |
| C1 | 1.0 micro F, 16 volt |
| C2 | 1.0 micro F, 16 volt |
| C3 | 4700 pico F, 50 volt |
| C4 | 0.018 micro F, 16 volt |
| Metal Oxide Varistor | |
| Z1 | 54 volts at 5 amps; 30 volts for 5 minutes |
| Transistors | |
| Q1 | Power MOSFET, 60 volts, 71 amps |
| Rectifier Diodes | |
| D1 | Schottky rectifier, 7 amp, 60 volt |
| Voltage Regulators | |
| VR1 | Precision shunt regulator |
| Integrated Circuits | |
| U1 | Microchip PIC Microprocessor, 8 pin SOIC |

While the invention has been described in conjunction with a specific embodiment, it is to be understood that many alternatives, modifications, and variations will be apparent to those skilled in the art in light of the foregoing description. For example instead of a 3-pin input (J1-1, J1-2, J1-3) for battery negative, battery positive and control signal, the same function could be performed with a 2-pin configuration. The battery positive and control signal could be tied together allowing the control signal to be obtained directly from the battery. This could be done with the above-noted 3-pin connector or with a 2-pin connector integral to the solenoid cover. The circuit function would remain the same. This eliminates the need for a separate low power signal to command the solenoid on and off.

Other examples include replacing the MOV with a transient voltage suppression device of a different type such as a transorb. To accomplish the digital to analog conversion, a PIC micro-controller with a D to A converter built in could be utilized. Alternatively, a different micro-controller could be utilized in place of the one time programmable micro-controller. The shunt regulator could be replaced with a series regulator to achieve the voltage regulation required by the micro-controller.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An integrated solenoid system comprising:
   a solenoid, said solenoid having a solenoid housing;
   a control circuit having an output connected to said solenoid;
   said control circuit directly and integrally connected to said solenoid within said housing;
   said control circuit including a temperature compensating means for monitoring system temperature and adjusting the control circuit output in consideration of system temperature; and
   said temperature compensating means being connected to said control circuit.

2. The integrated solenoid system of claim 1 wherein the temperature compensating means includes a temperature sensor located proximate said solenoid.

3. The integrated solenoid system of claim 2 wherein the temperature sensor is a thermistor.

4. The integrated solenoid system of claim 1 wherein the temperature compensating means includes a temperature sensor.

5. The integrated solenoid system of claim 4 wherein the temperature sensor is a thermistor.

6. An integrated solenoid system comprising:
   a solenoid, said solenoid having a solenoid housing;
   a control circuit having an output connected to said solenoid;
   said control circuit directly and integrally connected to said solenoid within said housing; and
   the control circuit including a voltage compensating means for monitoring supply voltage available at the solenoid system and adjusting the control circuit output.

7. An integrated solenoid system comprising:
   a solenoid, said solenoid having a solenoid housing;
   a control circuit having an output connected to said solenoid;
   said control circuit directly and integrally connected to said solenoid within said housing;
   the control circuit including a voltage compensating means for monitoring supply voltage available at the solenoid system and adjusting the control circuit output;
   the control circuit including a temperature compensating means for monitoring solenoid temperature and also adjusting the control circuit output; and
   said temperature compensating means being connected to said control circuit.

8. The integrated solenoid system of claim 7 wherein the temperature compensating means includes a temperature sensor located proximate said solenoid.

9. The integrated solenoid system of claim 8 wherein the temperature sensor is a thermistor.

10. The integrated solenoid system of claim 7 wherein the temperature compensating means includes a temperature sensor.

11. The integrated solenoid system of claim 10 wherein the temperature sensor is a thermistor.

12. An integrated solenoid system comprising:
    a solenoid, said solenoid having a solenoid housing;
    a said solenoid including an integrated control circuit;
    said control circuit directly and integrally connected to said solenoid within said housing;
    said control circuit having control means to control a voltage output to the solenoid at a plurality of predetermined levels and having timing means to control the sequence and timing of said predetermined voltage levels; and said control circuit including a temperature compensating means for monitoring system temperature and adjusting the voltage output.

13. The integrated solenoid system of claim 12 wherein the temperature compensating means includes a temperature sensor located proximate said solenoid.

14. The integrated solenoid system of claim 13 wherein the temperature sensor is a thermistor.

15. The integrated solenoid system of claim 12 wherein the temperature compensating means includes a temperature sensor.

16. The integrated solenoid system of claim 15 wherein the temperature sensor is a thermistor.

17. The integrated solenoid system of claim 12 wherein said voltage output is a pulse width modulated voltage.

18. The integrated solenoid system of claim 17 further including a power MOSFET switching device to switch the voltage output on and off to the solenoid; the switching device being connected to the control circuit.

19. The integrated solenoid system of claim 12 further including a schottky freewheeling diode connected across the solenoid.

20. An integrated solenoid system comprising:

a solenoid, said solenoid having a solenoid housing;

a control circuit;

said control circuit directly and integrally connected to said solenoid within said housing;

said control circuit having control means to control a voltage output to the solenoid at a plurality of predetermined levels and having timing means to control the sequence and timing of said predetermined voltage levels; and said control circuit including a voltage compensating means for monitoring a supply voltage available at the solenoid system and adjusting the voltage output.

21. The integrated solenoid system of claim 20 wherein said voltage output is a pulse width modulated voltage.

22. The integrated solenoid system of claim 21 further including a power MOSFET switching device to switch the voltage on and off to the solenoid; the switching device being connected to the control circuit.

23. The integrated solenoid system of claim 20 further including a schottky freewheeling diode connected across the solenoid.

24. An integrated solenoid system comprising:

a solenoid, said solenoid having a solenoid housing;

a control circuit;

said control circuit directly and integrally connected to said solenoid within said housing;

said control circuit having control means to control a voltage output to the solenoid at a plurality of predetermined levels and having timing means to control the sequence and timing of said voltage output;

said control circuit including a voltage compensating means for monitoring a supply voltage available at the solenoid system and adjusting the voltage output; and said control circuit including a temperature compensating means for monitoring a system temperature and adjusting the voltage output.

25. The integrated solenoid system of claim 24 wherein the temperature compensating means includes a temperature sensor located proximate said solenoid.

26. The integrated solenoid system of claim 25 wherein the temperature sensor is a thermistor.

27. The integrated solenoid system of claim 24 wherein the temperature compensating means includes a temperature sensor.

28. The integrated solenoid system of claim 27 wherein the temperature sensor is a thermistor.

29. The integrated solenoid system of claim 24 wherein said voltage output is a pulse width modulated voltage.

30. The integrated solenoid system of claim 29 further including a power MOSFET switching device to switch the voltage output on and off to the solenoid; the switching device being connected to the control circuit.

31. The integrated solenoid system of claim 24 further including a schottky freewheeling diode connected across the solenoid.

32. A solenoid assembly comprising:

a housing;

a solenoid, said solenoid being located within said housing;

a primary cover, said primary cover being adapted to be received on one end of said housing;

a secondary cover, said secondary cover being adapted to be received within an opening formed in said primary cover; and said primary cover being located on said housing end and said secondary cover being placed within said opening, said primary cover including an electrical connector.

33. The solenoid assembly of claim 32 wherein said secondary cover is secured to said primary cover with locking tabs.

34. The solenoid assembly of claim 33 wherein said housing contains a predetermined amount of potting material and said secondary cover includes an anchoring structure, said anchoring structure being adapted to be received within said potting material.

35. The solenoid assembly of claim 32 wherein the electrical connector includes a plurality of electrical connections.

36. The solenoid assembly of claim 32 wherein the electrical connector accepts a mating connector forming a watertight seal.

* * * * *